Oct. 17, 1961     J. LÜSCHER     3,005,146
SYSTEM OF VOLTAGE AND CURRENT REGULATION
FOR ROTARY GENERATORS

Filed May 2, 1958     2 Sheets-Sheet 1

INVENTOR
JAKOB LÜSCHER
BY
ATTORNEY

Oct. 17, 1961 J. LÜSCHER 3,005,146
SYSTEM OF VOLTAGE AND CURRENT REGULATION
FOR ROTARY GENERATORS
Filed May 2, 1958 2 Sheets-Sheet 2

INVENTOR
JAKOB LÜSCHER
BY
ATTORNEY

United States Patent Office 3,005,146
Patented Oct. 17, 1961

3,005,146
SYSTEM OF VOLTAGE AND CURRENT REGULATION FOR ROTARY GENERATORS
Jakob Lüscher, Geneva, Switzerland, assignor to Robert Bosch G.m.b.H., Stuttgart, Germany
Filed May 2, 1958, Ser. No. 732,601
Claims priority, application Germany May 2, 1957
6 Claims. (Cl. 322—25)

The present invention relates to improvements in the regulation of the terminal voltage of rotary electrical generators, more particularly though not limitatively, generators driven by prime movers subject to substantial variations of operating speed and/or generators called upon to supply widely varying loads, such as the electrical generators driven by the internal combustion engines of automotive vehicles, wind-driven generators and the like electrical power supply devices.

An object of the invention is the provision of an improved regulating system of this type, whereby the terminal voltage of a generator may be maintained at a substantially constant value within a given operating range, substantially independently of relatively wide variations of the speed of the prime mover driving the generator, in particular the combustion engine of a motor vehicle being subject to continuously varying operating speed.

Another object of the invention is the provision of an improved voltage regulating system of the above type, whereby the terminal voltage of a generator may be maintained at a substantially constant value, independently of relative wide variations of load current supplied by said generator.

Yet another object of the invention is the provision of means to substantially reduce the magnetic excitation of a generator and, in turn, to limit the voltage being generated, if the load current supplied by the generator exceeds a predetermined excess or limit value.

The advantages and improved effects of the invention, which will become more apparent as the following description proceeds, are of special importance in the case of a generator driven by an internal combustion engine cooperating with a storage battery required to supply substantial load currents in the inoperative or rest position of the generator, as is customary in connection with electrical power supply systems of automotive vehicles and the like power supply sources. In such a case it is necessary or desirable that the electrical energy supplied by the battery be restored rapidly by recharging of the battery by the generator upon reaching the predetermined or normal operating speed of the vehicle. This requirement will be practically fulfilled by a voltage regulator capable of maintaining the terminal voltage of the generator at a constant value within a wide range of operating conditions, including the case of maximum load current comprised by both the battery charging current and the current required by the consuming devices being energized by the generator, such as head lights, electric window lifts, radio and other electrically operated power assists and auxiliary devices.

Accordingly, a more specific object of the invention is the provision of a terminal voltage regulating system for a generator of the type referred to cooperating with a storage battery, whereby to maintain the terminal voltage of the generator at a desired (normal) value within relatively wide operating limits, including maximum load comprising both the battery charging current and current supplied to the consuming devices operated by said generator.

Although the invention is especially suitable for the utilization of semiconductive devices such as transistor amplifiers serving as varying impedances, junction diodes serving as reference or limit voltage devices, unidirectional current conductors etc., devices having equivalent operating characteristics or parameters may be used with equal advantage for carrying into effect the invention, as will become more apparent from and pointed out in the following.

The invention, as to its ancillary objects and novel aspects, will be better understood from the following detailed description of a few practical embodiments, taken in conjunction with the accompanying drawing forming part of this specification and in which.

Like reference characters denote like parts throughout the different views of the drawing.

With the foregoing objects in view, the invention involves generally the utilization of an amplifier, preferably, though not limitatively a direct-coupled semiconductive, such as a transistor or the like, amplifier having its output path connected in series with the field winding of a shunt-wound electrical generator, to act as a variable impedance responsive to a varying input control potential applied to said amplifier. The amplifier may be controlled, on the one hand, by a potential derived from and varying in dependence upon the terminal voltage of the generator, a reference voltage junction diode of the like stabilizing device being interposed in the lead to the amplifier control electrode, to cause the voltage regulation to be effective in maintaining a predetermined (normal) generator voltage by variation of the exciting current through said field winding in dependence upon wide variations of the generator operating speed. The amplifier may be further controlled in dependence upon a varying voltage drop produced by a resistor inserted in the load circuit, to additionally vary the field exciting current and to maintain the generator terminal voltage at its normal value, substantially independently of relatively wide load current variations.

The transistor or equivalent amplifier may be operated continuously, known as small-signal operation, or intermittently, known as large-signal operation, according to an improved feature of the invention. In the latter case, the amplifier is designed and/or adjusted to operate as a self-running relaxation oscillator, whereby to cause the field exciting current of the generator to be periodically interrupted and to provide a consecutive series of exciting current pulses or oscillations. While in the case of small-signal operation of the amplifier, the amplitude of the field current of the generator is varied continuously depending upon the operating conditions of the engine, the control in the case of large-signal or intermittent operation may be by the single or combined effects of amplitude, width and repetition frequency variation or modulation of the relaxation current pulses, in such a manner as to vary the average field excitation of the generator and to again maintain a constant terminal voltage, independently of the generator voltage and/or load current changes. The intermittent operation of the transistor or equivalent amplifier has the advantage of reduced losses or increased peak power, resulting in greater efficiency and economy of the regulation, as well as in reduced costs and other advantages obvious to those skilled in the art.

Figure 1:
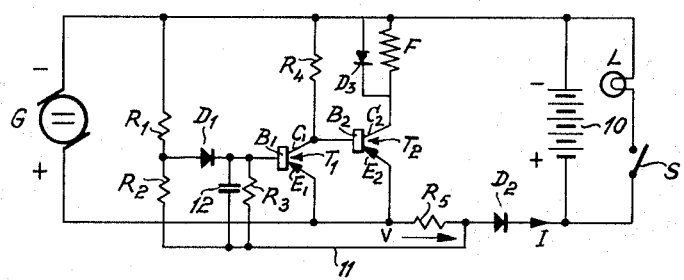
FIG. 1 is a circuit diagram of a voltage regulating system embodying the principles of the invention and utilizing a semiconductive diode as a reference voltage device and a transistor amplifier as a variable impedance or control device operated in continuous or so-called small-signal control or operation.

Referring more particularly to FIG. 1 of the drawing, the generator G of conventional type has an armature winding and a field winding F in shunt relation thereto, to produce a voltage as indicated by the plus and minus signs in the drawing. Connected in series with the field winding F is the emitter-collector path $E_2$—$C_2$ of a power transistor $T_2$, such as a PNP junction transistor represented by the conventional symbol in the drawing. The transistor is shown operated in the common emitter configuration, that is, with the emitter $E_2$ connected to the plus pole and with the collector $C_2$ connected to the minus pole of the generator G and with the control potential being applied to the base $B_2$ of the transistor. Further connected to the generator in a known manner is a storage battery 10 and load circuit, the latter including one or more load or consuming devices, as indicated by the lamp L, and an operating or control switch S.

The base or control electrode $B_2$ of the transistor $T_2$ is connected, in the example shown, both to the collector $C_1$ of a further transistor $T_1$ and to the end of a combined biasing and load resistor $R_4$ having its remaining end connected to the negative terminal of the generator G. The emitter $E_1$ of transistor $T_1$ is directly connected to the positive terminal of the generator, the same as the emitter $E_2$ of the transistor $T_2$. There is further provided a load resistor $R_5$ inserted in the lead from the transistor $T_2$ to the battery 10, to produce a voltage drop V varying in proportion to the load supplied by the generator. Further connected between the plus pole of the battery 10 and the load resistor $R_5$ is a unidirectional conductive device, such as a silicon diode or the like, to prevent a reverse current flow from the battery into the generator, in the manner of a conventional cut-out relay used in connection with automobile voltage regulators.

The junction between resistor $R_5$ and diode $D_2$ is connected through a lead 11 to one end of a voltage divider resistor $R_2$ which is, in turn, connected to the minus pole of the generator through a further resistor $R_1$. The junction between resistors $R_1$ and $R_2$ is connected to the base $B_1$ of transistor $T_1$ through a reference voltage Zener diode or the like unidirectional reference impedance $D_1$, the latter being located ahead of the resistor $R_3$.

The reference impedance or diode $D_1$ may be in the form of a reversely-biased PN junction diode which in a known manner exhibits a relatively high impedance over a certain range of increasing reverse bias voltage until reaching a critical operating point or voltage, where a sudden change occurs from high to low impedance, resulting in a constant voltage drop substantially independent of the applied voltage or current through the device. For practical purposes, a sufficiently high protective impedance should be placed in series with the diode, to prevent an avalanche-like breakdown and destruction of the device. In the present case, adequate protection may be afforded by the potentiometer resistors $R_1$ and $R_3$. For further details about reference junction diodes of this type reference is made to U.S. Patent No. 2,714,702.

In operation, during the starting of the generator G, the base of transistor $T_2$ is biased through resistor $R_4$ so that its emitter-collector path offers a relatively low impedance or practically presents a short-circuit to the exciting current flowing through the field winding F, while the transistor $T_1$ is blocked during the starting period by the diode $D_1$. The latter is so designed in relation to the series resistors $R_1$ and $R_3$ that it becomes conductive or reaches its critical voltage when the generator voltage reaches the desired operating or normal value, such as 6 or 12 volts in the case of a conventional automobile power supply. As a result, a base current begins to flow through the transistor $T_1$, resulting in an amplified collector current through resistor $R_4$, thereby causing the potential of the base $B_2$ of transistor $T_2$ to become more positive and, in turn, to increase the emitter-collector impedance of the transistor. As a result, the exciting current through the field winding F is reduced, whereby to result in a corresponding reduction of the voltage generated by the generator G. The latter is thus automatically maintained at a desired value determined by the critical voltage of the reference diode $D_1$ or equivalent impedance reference device, substantially independently of the speed or voltage generated by the generator G.

The regulation in dependence upon a varying load current is similar and effected through the action of the load resistor $R_5$. More specifically, upon closing of the switch S and connection of the load L (head lights etc.) to the generator G and battery 10, the load current passing through the resistor $R_5$, which may have a value of about 0.035 ohm, produces a varying voltage drop V being applied to the base $B_1$ of the transistor $T_1$ by way of lead 11 and resistor $R_3$, in addition to the bias voltage applied to said base by way of the reference diode $D_1$. As a result, the base $B_1$ of transistor $T_1$ becomes more negative, or its negative potential increases in such a manner as to reduce the current through the reference diode $D_1$. For a specified maximum admissible load current, the voltage drop across the resistance $R_5$ is such that the current through the reference diode $D_1$ becomes zero. Any further increase of load current beyond this critical value results in a very strong increase of the current through the output resistor $R_4$ and decrease of the voltage between the base $B_2$ and emitter $E_2$ of transistor $T_2$. This, in turn, results in a decrease of the output current through the field winding F and decreased excitation of the generator G. The smaller magnetic exciting field results in a strong voltage decrease for the increased load current above the admissible load current. If the resistor $R_5$ is adjustable, its value may be controlled, in order to adjust it for the admissible load current.

If NPN transistors are used in FIG. 1, the polarity of the generator G and battery 10 should be reversed as will be readily understood by those skilled in the art. Furthermore, the reference diode $D_1$ may be replaced by an equivalent impedance device having a similar non-linear characteristic to that described, such as a gas discharge tube especially suitable for relatively high generator voltages.

Figure 2:
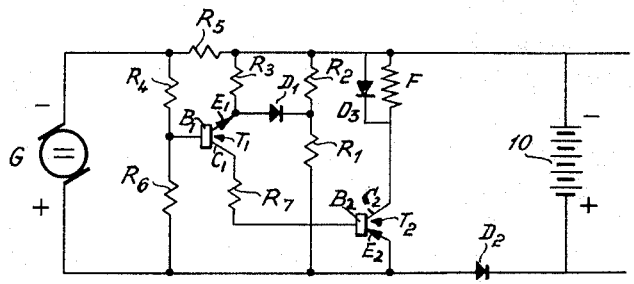
FIG. 2 shows a modification of FIG. 1.

Referring to FIG. 2, there is shown a modification of a control system of the type according to FIG. 1, but differing from the latter by the use of a transistor $T_1$ of the NPN type operated in common base configuration and being conductively connected by current coupling to the transistor $T_2$. For this purpose, the emitter $E_1$ is connected to the minus pole of the generator through a biasing resistor $R_3$ and the series load resistor $R_5$, connected in the negative supply lead of the generator, while the collector $C_1$ is connected to the base $B_2$ of the transistor $T_2$ through a further resistor $R_7$. Transistor $T_2$ has its emitter-collector path inserted in series with the field winding F, in the same manner as shown in FIG. 1.

The base $B_1$ of transistor $T_1$ is biased by connection to the junction of a pair of fixed voltage divider resistors $R_4$ and $R_5$ connected across the generator terminals, while the reference or Zener diode $D_1$ is connected between the emitter $E_1$ and the junction between further voltage divider resistors $R_1$ and $R_2$ connected between the positive pole and the end of resistor $R_5$ on the side opposite from the negative pole of the generator G. A diode $D_2$ acting as a unidirectional conductor is again connected between the generator G and the battery 10, to prevent a reverse battery current flow through the generator. Connected across the field winding F in the current blocking direction is a further diode $D_3$, the purpose and function of which will be described hereinafter.

In operation, as the generator voltage increases, current flows through the emitter-base junction of the transistor $T_1$ via the biasing resistors $R_3$ and $R_6$, resulting in a collector current being returned through the base-emitter junction of the transistor $T_2$. This, in turn, causes an exciting current flowing through the field winding F. As soon as the normal generator operating voltage is exceeded, a current begins to flow through the circuit including the reference diode $D_1$ and resistors $R_1$ and $R_3$, causing the potential of the emitter $E_1$ to become more positive and reducing the emitter current and in turn the output currents of both transistors $T_1$ and $T_2$. As a result, the excitation of the generator is reduced, thus causing a reduction of the generator voltage to its normal value, in substantially the same manner as described with reference to FIG. 1.

Figure 3:
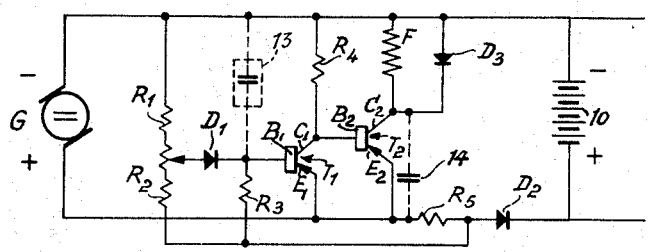
FIG. 3 is a circuit diagram of an alternative voltage regulating system according to the invention utilizing a transistor amplifier operated in intermittent or so-called large-signal control or operation.
Figure 4:
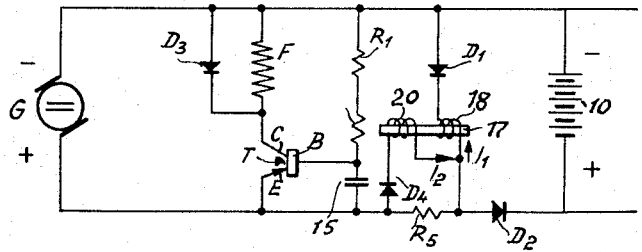
FIGS. 4 and 5 represent modifications of systems of the type according to FIG. 3.
Figure 5:
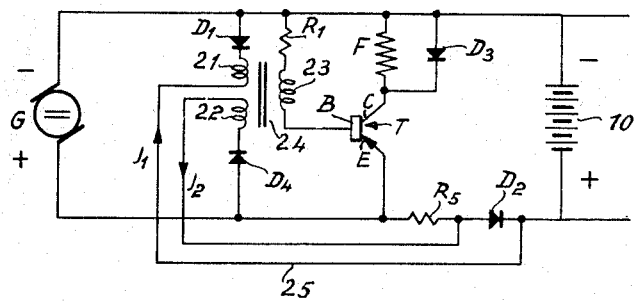

In contrast to the embodiments of FIGS. 1 and 2, involving a continuous variation of the field excitation current of the generator G (small-signal operation of the transistors), the embodiments according to FIGS. 3 to 5 utilize a periodically interrupted exciting current by operating the transistor or equivalent amplifier as a relaxation oscillator, that is, by causing the transistor $T_2$ in series with the field winding F to vary abruptly and periodically between a condition of high and low impedance (large-signal operation of the transistors). Control of the field current is effected in this case by controlling the initiation of the oscillating pulses in response to changes of the generator terminal voltage and/or load current supplied by the generator, resulting in a variation of the amplitude and/or width and/or recurrence frequency of the pulses. This, in turn, results in an average field exciting current through the winding F. The relaxation oscillations may be produced or maintained in any known manner such as by utilizing the inductance of the field and/or armature windings of the generator, if necessary in conjunction with additional feedback and/or phase-shifting circuit elements or devices.

As is well known, in the relaxation type of oscillator, oscillation pulses are produced by causing an electric or magnetic field to be built up in a capacitance or inductance until a set of limiting conditions is reached resulting in a sudden dissipation of the field until a second set of limiting conditions causes the field to build up again and so on. In the case of the present invention, the limiting conditions may be caused by the current change or saturation of the transistors or by the inherent non-linear impedance characteristic of the reference diode or equivalent reference impedance.

Referring more particularly to FIG. 3, the latter differs essentially from FIG. 1 by the omission of the capacitor 12 shunting the base resistor $R_3$ and the provision of a unidirectional conductive element, such as a diode $D_3$, connected in current-blocking direction across the field winding F. In this manner, there is ensured a favorable oscillating condition of the system comprising both the transistors $T_1$ and $T_2$.

If the circuit operated as a relaxation oscillator utilizing the limit (saturation) current of the transistor, the diode $D_1$ may again serve as a voltage reference or standard, in the same manner as in the case FIG. 1. Alternatively, the limit conditions of the diode, that is, its sudden transition from a condition of high to low impedance, and vice versa, at the critical operating point, may be relied upon to maintain the relaxation oscillation in conjunction with the inherent inductance or capacitance of the circuit and/or any additional auxiliary inductance or capacitance included therein. In the latter case, the system changes periodically between two unstable conditions below and above the critical voltage of the diode $D_1$, with the initiation of the pulses and, in turn, the average field exciting current again being controlled by the transistors in dependence upon the generator terminal voltage and/or load current, in substantially the same manner as described hereinabove. The latter operation is enabled especially by the provision of diode $D_3$ shunting the field winding F in the blocking direction of the collector current of the transistor.

In order to maintain the oscillations over a substantial range of generator speed or voltage changes, additional phase-shifting elements may be provided in the form of auxiliary capacitors, inductors or combinations of both, including networks of capacitors and/or inductors in combination with series or parallel resistors adapted to extend and stabilize the oscillating range of the system. In the latter case, the size of the inductor or capacitor elements may be reduced substantially by arranging the same in the input or control circuit of the transistor $T_1$, as shown by the dotted lines at 13 in the drawing.

More specifically, the purpose and function of the diode $D_3$ is to enable a complete blocking of the transistor during the current interrupting periods or intervals between the exciting current pulsations through the field winding F. During the flow of current through the transistor $T_2$ and winding F exciting the generator G, the diode $D_3$ offers an extremely high resistance to the current, amounting to a practical open-circuit compared with the relatively low resistance of the field winding F. At the instants of blocking of the transistor $T_2$, the field excitation current is prevented from instantly becoming zero due to the inductance of the field winding, whereby to result in an equalizing current through the diode $D_3$ during the collapse of the magnetic field. This enables an instant and complete blocking of the transistor $T_2$ until the equalizing current through the diode $D_3$ has been reduced to a sufficiently low value, to cause the terminal voltage of the generator to decrease slightly, say about 0.1 volt, when a new relaxation pulse is started rendering the transistor again conductive and capable of carrying a current substantially in excess of the maximum equalizing current. At the start of the transistor current, the diode $D_3$ again becomes non-conductive.

Considered from a different angle, the diode $D_3$ alternates with the transistor $T_2$ in conducting the field current through the winding F, thus enabling the transistor to operate periodically between the limit conditions of zero and maximum conductivity reliably and efficiently. This, in turn, involves a rapid transition period between one and the other of said limit conditions accompanied by high internal losses of the transistor, compared with the limit conditions involving a relatively low collector current loss only. Due to the reduced resultant losses, transistors of relatively low power may be employed for the purpose of the invention, compared with the small-signal or continuous operation according to FIGS. 1 and 2. A similar effect of the diode $D_3$ is obtained in the case of FIGS. 1 and 2 during relatively rapid or sudden changes of the speed and/or load of the generator.

As a result of this action of the diode $D_3$ of FIG. 3, the field exciting current through the winding F increases and decreases gradually during the instants when the transistor becomes conductive or non-conductive, respectively, while the current pulsates about a definite mean or average value, the pulsating amplitude or component being of the order of not more than about 10 to 20% of the mean exciting current. The latter remains constant as long as the speed and load remain the same. As soon as a change of either occurs, the average field exciting current is varied in substantially the same manner as in the case of FIGS. 1 and 2, resulting in the maintenance of the generator voltage at the desired or normal value, independently of changes of the speed of and load current being supplied by the generator.

According to the embodiment of FIG. 4, operating basically in a manner similar to FIG. 3, there is utilized a single transistor T connected and operated in the manner of a well known self-running blocking oscillator, to produce self-excited relaxation oscillations or pulses exciting the field winding F. For this purpose, there is provided, in the example shown, a capacitor 15 connected between the base B and the collector C of the transistor, while the control of the current pulsations is effected by means of a voltage-responsive biasing resistance 16 connected in series with the base biasing resistor $R_1$. Resistance 16 may, for instance, be in the form of a well known Hall conductor, as shown in the drawing, consisting of a bar of semiconductive material, such as germanium or the like, adapted to vary its electrical resistance within substantial limits if subjected to magnetic field applied at right angle to said bar or the direction of current flow through the semiconductor. There is shown for this purpose in the drawing a control magnet 17 having a pair of control windings 18 and 20. Winding 18 is excited by the generator voltage via the reference diode $D_1$ and winding 20 is excited by the voltage drop V of the load resistor $R_5$ via a further unidirectional conductive element, such as a diode $D_4$.

In operation, as the generator voltage reaches its normal operating value, a current $I_1$ starts to flow through the winding 18 and reference diode $D_1$ whereby to vary the magnetic field and, in turn, the resistance of the Hall conductor 16 and to displace the operating bias of the transistor in a direction such as to reduce the width and amplitude of the relaxation pulses and, in turn, the average field excitation current through the winding F. The direction of the exciting current $I_1$ and $I_2$ of the windings 18 and 20 is such as to produce magnetic fields in the magnet core 17 opposing one another, as indicated by the arrows in the drawing, whereby to control the relaxation pulses through the field winding in a manner to result in a composite variation of the average field exciting current, to maintain a substantial constant generator terminal voltage, independently of both generator speed variations and changes of load current supplied by said generator. The diode $D_2$ again serves to prevent a reverse battery current flow through the generator, in a manner similar as in the preceding views of the drawing.

The arrangement according to FIG. 5 also utilizes a single transistor T cooperating with the reference diode $D_1$ as a limiting means to generate and maintain a series of relaxation pulses or oscillations. For this purpose, the base B of the transistor is connected to a negative pole of the generator G via the biasing resistor $R_1$ in series with the secondary winding of a transformer having an iron core 24 and a pair of primary windings 21 and 22. Winding 21 is connected to the negative pole of the generator via the reference diode $D_1$, on the one hand, and to the plus pole of the battery 10 through a lead 25, and the diode $D_2$ and load resistor, acting as a protective impedance, on the other hand.

As soon as the generator terminal voltage reaches its normal operating value, a current starts to flow through winding 21, resulting in the induction of a high voltage pulse in the secondary winding 23 temporarily blocking the transistor. The ensuing reduction of the exciting current through the field winding F causes a slight decrease of the generator voltage below the critical voltage of the reference diode $D_1$. As a result, the resistance of the latter decreases suddenly to a relatively low value, whereby to cause an abrupt decrease of the current $I_1$ through the primary winding 21, that is, to an extent relatively greater than determined with the reduction of the generator voltage. This, in turn, results in a voltage pulse being induced in the secondary winding 23 rendering the transistor conductive and causing the generator voltage to rise again. This operation is repeated periodically, whereby to result in an average field exciting current and maintenance of the generator terminal voltage at the desired normal value as determined by the critical voltage of the reference diode $D_1$ or equivalent non-linear reference impedance.

If the generator is subjected to a varying load, the voltage drop V of the resistor $R_5$ causes a current flow $I_2$ through the primary winding 22, again resulting in voltage pulse induced in the secondary winding 23 such as to unblock the transistor and to cause the average field exciting current to compensate for the varying load conditions, in substantially the same manner as described hereinbefore.

The advantages of the intermittent control of the field excitation current, FIGS. 3 to 5, over a continuous operation, FIGS. 1 and 2, will be further understood from the following.

In the case of FIGS. 1 and 2, the maximum admissible losses in the power transistor $T_2$ are determined by the product of the effective voltage between the emitter and collector and the field exciting current flowing through the emitter-collector path of the transistor. Assuming, as an example, a normal generator voltage of 12 volts and a maximum rated generator power of 180 watts, the field winding has to carry a maximum exciting current of two amperes and accordingly should have a D.C. resistance not exceeding 6 ohms. However, if the generator is called upon to supply only 100 watts, the exciting current through the winding F should be not more than about 0.8 amperes, in which case the voltage drop through the winding F would be 4.8 volts, that is a difference of 7.6 volts remains across the emitter-collector path of the transistor, resulting in a power dissipation or loss in the transistor of $0.8 \times 7.6 =$ about 6 watts.

In the embodiments according to FIGS. 3 to 5, on the other hand the collector circuit of the power transistor $T_2$ is periodically interrupted and, since during the periods of high field excitation current (2 amperes) only a small emitter-collector voltage is required, being of the order of about 1 volt and, conversely, since during the blocking periods the transistor operates with an emitter-collector voltage of about 10 volts and carries a collector current of only about 0.3 ampere or less, the maximum dissipation or loss in the transistor for the case of intermittent operation is found to be about 3 watts.

In the foregoing, the invention has been described with reference to a few specific illustrative devices. It will be evident, however, that variations and modifications, as well as the substitution of equivalent elements or circuits for those shown for illustration, may be made within the broader purview and spirit of the invention as set forth in the appended claims. The specification and drawing are accordingly to be regarded in an illustrative rather than a limiting sense.

I claim:

1. A control system for a shunt-wound generator having an armature winding and a field winding and being subject to variations of both the voltage generated and load current supplied by said generator, said system comprising a transistor amplifier having an emitter and a base forming a pair of input electrodes and an emitter-collector output path, means connecting said output path in series with said field winding, to control the field current and in turn the generated voltage in inverse relation to a varying control voltage applied to said input electrodes, load means connected to said generator, a resistor connected between one of the generator terminals and said load means to be traversed by said load current, a voltage divider circuit connected between the other generator terminal and the far side of said resistor in respect to said first generator terminal, a reversely biased reference junction diode connected between a point of said voltage divider circuit and one of said input electrodes, a conductive connection between the other input electrode and said first generator terminal, whereby to provide a first control voltage by said voltage divider circuit applied to said input electrodes through said diode, to maintain the generator terminal voltage substantially constant at a value determined by the breakdown voltage of said diode, and a further direct conductive connection between the far side of said resistor and said first-mentioned input electrode, whereby to provide a second control voltage by the voltage drop through said resistor applied to said input electrodes, said resistor having a value to cause a substantial reduction of the field current of said generator upon the occurrence of a load current exceeding a predetermined permissible limit value.

2. A regulating system as claimed in claim 1, including a storage battery connected between said second generator terminal and the far side of said resistor, and a unidirectional conducting device connected between said battery and said generator, to pass said load current and to substantially prevent reverse current flow from the said battery to said generator.

3. A regulating system as claimed in claim 1, including a storage battery connected between said second generator terminal and the far side of said resistor, and a junction rectifier connected in series with said battery and said generator, to pass said load current and to substantially prevent reverse current flow from said battery to said generator.

4. A regulating system as claimed in claim 1, including a series resistance inserted in said further conductive connection.

5. A regulating system as claimed in claim 1, said amplifier comprising an input control stage and an output power stage directly coupled thereto, to cause increasing input voltage to produce a decreasing output current.

6. A control system for a shunt-wound generator having an armature winding and a field winding connected in parallel, said generator subject to variations of both the voltage generated and load current supplied thereby, said system comprising a transistor amplifier having an emitter and a base forming a pair of input electrodes and an emitter-collector output path, means connecting said output path in series with said field winding, to control the field exciting current and in turn the generated voltage in inverse relation to a varying control voltage applied to said base and emitter, load means connected to said generator, a resistor connected between the generated terminal adjoining the emitter terminal of said output path and said load means to be traversed by said load current, a resistive voltage divider circuit connected between the other generator terminal and the far side of said resistor in respect to said first generator terminal, a reversely biased reference junction diode connected between a point of said voltage divider circuit and said base, a conductive connection between said emitter and said first generator terminal, whereby to provide a first control voltage by said voltage divider circuit applied to said base and emitter through said diode, to maintain the generator terminal voltage substantially constant at a value determined by the breakdown voltage of said diode, and a further direct conductive connection between the far side of said resistor and said base, whereby to provide a second control voltage by the voltage drop through said resistor applied to said emitter and said base, said resistor having a value to cause a substantial reduction of the field current of said generator upon the occurrence of a load current exceeding a predetermined permissible limit value.

References Cited in the file of this patent

UNITED STATES PATENTS

| | | |
|---|---|---|
| 2,809,301 | Short | Oct. 8, 1957 |
| 2,862,175 | Guyton et al. | Nov. 25, 1958 |
| 2,892,143 | Sommer | June 23, 1959 |